(12) United States Patent
Bankwitz et al.

(10) Patent No.: US 8,618,235 B2
(45) Date of Patent: Dec. 31, 2013

(54) SILICONE COMPOSITION

(75) Inventors: Uwe Bankwitz, Steinmaur (CH); Boris Kranjcevic, Kriens (CH); Alexander Djurdjevic, Zürich (CH); Davide Bianchi, Muri (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 12/309,734

(22) PCT Filed: Aug. 30, 2007
(Under 37 CFR 1.47)

(86) PCT No.: PCT/EP2007/059022
§ 371 (c)(1),
(2), (4) Date: Oct. 20, 2009

(87) PCT Pub. No.: WO2008/025812
PCT Pub. Date: Mar. 6, 2008

(65) Prior Publication Data
US 2010/0063190 A1  Mar. 11, 2010

(30) Foreign Application Priority Data
Aug. 30, 2006  (EP) ...................................... 06119744

(51) Int. Cl.
*C08G 77/08* (2006.01)
*C08K 5/5419* (2006.01)
*B05D 3/02* (2006.01)

(52) U.S. Cl.
USPC .............................. 528/18; 524/261; 427/387

(58) Field of Classification Search
None
See application file for complete search history.

(56) References Cited

U.S. PATENT DOCUMENTS

| | | | | |
|---|---|---|---|---|
| 3,189,576 A | * | 6/1965 | Sweet | 528/35 |
| 3,471,434 A | * | 10/1969 | Lengnick et al. | 524/859 |
| 3,609,178 A | * | 9/1971 | Thomas | 528/34 |
| 4,105,617 A | * | 8/1978 | Clark et al. | 524/379 |
| 4,218,359 A | * | 8/1980 | Marwitz et al. | 524/794 |
| 4,247,442 A | * | 1/1981 | Shimizu | 524/83 |
| 4,371,682 A | * | 2/1983 | Hashimoto | 528/34 |
| 4,454,262 A | * | 6/1984 | Fukayama et al. | 523/210 |
| 4,529,749 A | * | 7/1985 | Favre et al. | 523/122 |
| 4,555,560 A | * | 11/1985 | Saruyama et al. | 528/17 |
| 4,657,967 A | * | 4/1987 | Klosowski et al. | 524/860 |
| 4,720,530 A | * | 1/1988 | Wurminghausen et al. | 528/18 |
| 4,973,623 A | * | 11/1990 | Haugsby et al. | 524/863 |
| 5,086,107 A | * | 2/1992 | Arai et al. | 524/424 |
| 5,217,651 A | * | 6/1993 | Nagaoka | 252/519.2 |

(Continued)

FOREIGN PATENT DOCUMENTS

DE 195 07 416 C1 9/1996
EP 0 543 615 A1 5/1993

(Continued)

OTHER PUBLICATIONS

Gelest catalog: Reactive Silicones: Forging New Polymer Links, 2004, 64 pages.*

(Continued)

*Primary Examiner* — Robert S Loewe
(74) *Attorney, Agent, or Firm* — Oliff & Berridge, PLC

(57) ABSTRACT

The present invention relates to silicone compositions which comprise at least one ketoximosilane-terminated polydiorganosiloxane and also at least one alkoxysilane. These compositions are neutrally crosslinking and combine a low odor with high adhesion and good storage stability.

21 Claims, 1 Drawing Sheet

(56) References Cited

U.S. PATENT DOCUMENTS

| | | | |
|---|---|---|---|
| 5,247,011 A * | 9/1993 | Tsuji et al. | 524/731 |
| 5,266,631 A | 11/1993 | Arai et al. | |
| 5,356,954 A * | 10/1994 | Adachi et al. | 523/200 |
| 5,514,766 A * | 5/1996 | Mathew et al. | 528/34 |
| 5,534,563 A * | 7/1996 | Lin et al. | 523/122 |
| 5,534,588 A * | 7/1996 | Knepper et al. | 524/730 |
| 5,565,541 A * | 10/1996 | Carbary et al. | 528/17 |
| 5,633,302 A * | 5/1997 | Adachi et al. | 524/262 |
| 5,639,823 A * | 6/1997 | Adachi et al. | 524/864 |
| 5,679,725 A * | 10/1997 | Fisher | 523/212 |
| 5,733,960 A * | 3/1998 | Altes et al. | 524/432 |
| 5,789,480 A * | 8/1998 | Adachi et al. | 524/863 |
| 5,895,794 A * | 4/1999 | Berg et al. | 523/217 |
| 5,939,487 A * | 8/1999 | Kimura et al. | 524/786 |
| 6,074,588 A * | 6/2000 | Yamana et al. | 264/130 |
| 6,451,440 B2 * | 9/2002 | Atwood et al. | 428/448 |
| 6,471,820 B1 | 10/2002 | Paulick | |
| 6,545,104 B1 | 4/2003 | Mueller et al. | |
| 6,562,931 B1 * | 5/2003 | Knepper | 528/17 |
| 6,645,339 B1 * | 11/2003 | DeCato | 156/329 |
| 7,049,384 B1 | 5/2006 | Friebe et al. | |
| 7,205,050 B2 * | 4/2007 | Haas | 428/447 |
| 7,504,468 B2 * | 3/2009 | Guennouni et al. | 528/17 |
| 2004/0006190 A1 | 1/2004 | Sakamoto et al. | |
| 2006/0276559 A1 * | 12/2006 | Hernandez et al. | 521/151 |
| 2008/0284106 A1 * | 11/2008 | Maton et al. | 277/316 |
| 2010/0139843 A1 * | 6/2010 | DeCato | 156/93 |

FOREIGN PATENT DOCUMENTS

| | | |
|---|---|---|
| EP | 0 384 609 B2 | 8/1994 |
| EP | 1 031 611 A1 | 8/2000 |
| EP | 1 342 742 A1 | 9/2003 |

OTHER PUBLICATIONS

Oct. 25, 2011 Office Action issued in Japanese Patent Application No. 2009-526103 with translation.

Oct. 11, 2010 Office Action issued in Chinese Patent Application No. 200780032133.5 with translation.

* cited by examiner

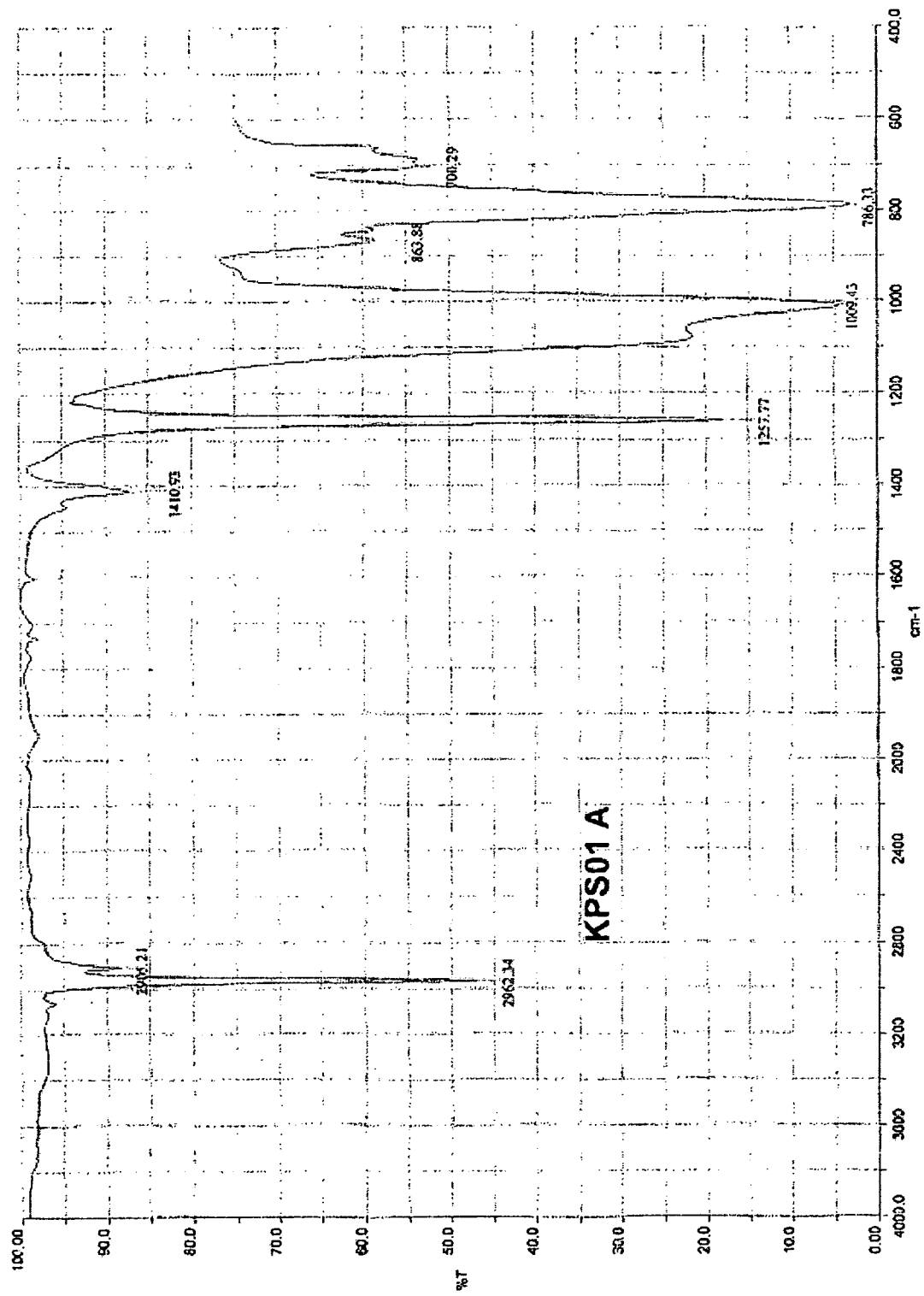

SILICONE COMPOSITION

FIELD OF THE INVENTION

The present invention pertains to the field of silicone compositions.

DESCRIPTION OF THE PRIOR ART

Silicones are known compositions which have already long been used as sealants. One-component silicones are moisture-reactive and cure under the influence of water. It is prior art that such silicone compositions are composed of polydiorganosiloxanes and a crosslinker.

According to leaving group and species which is released on curing, a distinction is made between acidically or neutrally crosslinking silicone compositions.

Acidically crosslinking silicone compositions contain, for example, acyloxysilane groups, which give off carboxylic acids on crosslinking. A disadvantage with these acidically crosslinking systems, however, is that the odor of the carboxylic acid formed on crosslinking is often perceived as a nuisance. EP-A-1 342 742 describes a polysiloxane material comprising acyloxysilane group terminated polysiloxanes and also an alkoxysilane crosslinker. Acidically crosslinking silicone compositions of this kind are disadvantageous, however, since in addition to the nuisance odor the carboxylic acid formed can lead to problems in the case of use on particular substrates, such as metals or concrete, for example. Furthermore, silicone compositions of this kind also have problems in terms of storage stability.

Neutrally crosslinking silicone compositions contain, for example, alkoxysilane or ketoximosilane groups.

Alkoxysilane based silicone compositions have the great disadvantage that they exhibit a shortened storage stability and certain weaknesses in adhesion on different substrates.

For example, EP-A-384 609 describes a hydroxyl-terminated polysiloxane which is crosslinked with alkoxy- or alkoxyalkoxy-silanes and is compounded directly. A silicone composition of this kind, however, has certain disadvantages: for example the fact that the hydrolysis of alkoxysilane groups is relatively slow and, in comparison to oxime-crosslinking silicone compositions, exhibit a relatively low through-curing rate, relatively low storage stability, and weaknesses in the adhesion.

EP-A-0 543 615 describes silicone compositions which comprise hydroxyl-terminated polysiloxane and comprise ketoximo-silanes as crosslinkers, and are compounded directly. Silicone compositions of this kind, despite their improved storage stability and adhesion, nevertheless have a very strong odor, caused by the intense odor of the ketoxime formed on crosslinking. The large amount of ketoximes formed is also disadvantageous in that the ketoximes, especially the frequently encounted methyl ethyl ketoxime (MEKO), are considered harmful to health and accordingly in that such silicone compositions, under the applicable provisions in the European Union (EU), are categorized as "Xn" and must be labeled with the risk phrase "R40" (limited evidence of carcinogenic effect).

The use of alkoxy-terminated polysiloxanes in combination with alkoxysilane crosslinkers is described in DE-C-195 07 416, for example. There, owing to the addition of phosphorus compounds, the poor adhesion and storage stability of purely alkoxy-terminated polysiloxanes is improved. The improvement, however, is of limited extent and is still significantly worse than the ketoxime-crosslinking compositions. Moreover, they often exhibit great problems in through-curing, which must be considered a great disadvantage particularly in the case of high-build applications.

SUMMARY OF THE INVENTION

It is an object of the present invention, therefore, to overcome the disadvantages of the prior art and in particular to provide a neutrally crosslinking silicone composition which exhibits a low odor in combination with effective adhesion and good storage stability.

Surprisingly it has been possible to achieve this with a silicone composition according to claim 1.

Preparing the silicone compositions does not involve complicated reaction conditions and/or apparatus. Thus, in particular, the ketoximosilane-terminated polydiorganosiloxanes can be prepared very simply by means of a rapid chemical reaction at room temperature. This simple and rapid preparation thus represents great economic and environmental advantages.

In particular it has emerged that, in one embodiment of the invention, the ketoximosilane-terminated polydiorganosiloxane can be formed in situ and therefore represents a very efficient method of preparation.

Very surprisingly, in spite of the ketoximosilane groups in the silicone composition, the odor, both on application and on curing, is impaired only slightly in comparison with purely alkoxysilane-based silicone compositions, i.e., silicone compositions which are free from ketoximosilane groups. At the same time these silicone compositions exhibit excellent storage stability and adhesion, comparable with the known, purely oxime-crosslinking silicone compositions, but without exhibiting their disadvantages of the large amount of ketoximes formed in the reaction. This makes possible, accordingly, silicone compositions which exhibit great advantages environmentally and from a health standpoint.

DESCRIPTION OF THE PREFERRED EMBODIMENTS

The present invention relates to silicone compositions. The silicone composition comprises (a) at least one ketoximosilane-terminated polydiorganosiloxane of the general formula (I)

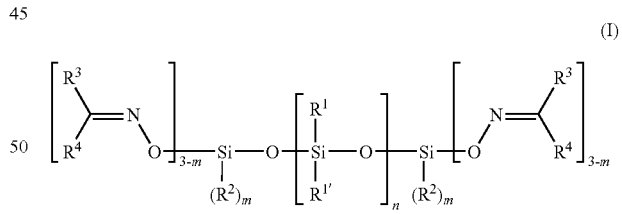

where
R$^1$ and R$^{1'}$ independently are each an unsubstituted or substituted alkyl or alkenyl or aryl radical, preferably methyl;
R$^2$ independently at each occurrence is an unsubstituted or substituted alkyl or alkenyl or aryl radical;
R$^3$ and R$^4$ are each an alkyl radical;
n stands for values from 20 to 3000, preferably for values from 100 to 1600;
and m is either 0 or 1;
and
(b) at least one alkoxysilane of the general formula (II)

$$(R^5)_p Si(OR^6)_{4-p} \qquad (II)$$

where

R⁵ independently at each occurrence is an unsubstituted or substituted alkyl or alkenyl or aryl radical or a radical of the formula $-(R^7-O)_q-R^8$, preferably vinyl or methyl;

R⁶ independently at each occurrence is H or is an alkyl radical,

R⁷ is an alkylene, more particularly a $C_2$ to $C_4$ alkylene;

R⁸ is an alkyl radical, and p is either 0 or 1, and q stands for a value between 1 and 5.

$R^1$ and $R^{1'}$ are in particular methyl, ethyl, propyl, vinyl, allyl, trifluoromethyl or phenyl. The radicals $R^1$ and $R^{1'}$ are preferably identical. Preferably they are each methyl groups.

$R^2$ is in particular phenyl, vinyl or methyl. $R^2$ is preferably methyl or vinyl.

The alkyl radicals represented by $R^3$ and $R^4$ are preferably unbranched or branched $C_1$ to $C_6$ alkyl radicals. $R^3$ and $R^4$ are preferably methyl, ethyl, n-propyl, isopropyl, n-butyl or isobutyl. Particular preference is given to those cases in which $R^3$ is methyl and $R^4$ is methyl, ethyl or isobutyl. Most preferably $R^3$ is methyl and $R^4$ is ethyl.

In formula (I) m is either 0 or 1. Accordingly the formula (I) has 4 to 6 ketoximo groups. If m>1 the mechanical properties of the cured silicone compositions are adversely affected to such an extent that they are unsuitable for application as a sealant and/or adhesive. It is considered particularly preferred if m stands for the value of 0.

The molecular weight ($M_n$) of the ketoximosilane-terminated polydiorganosiloxane of the general formula (I) is preferably between 2000 and 200 000 g/mol, in particular between 10 000 and 100 000 g/mol.

The ketoximosilane-terminated polydiorganosiloxanes of the general formula (I) are obtainable in particular by reacting at least one hydroxy-terminated polydiorganosiloxane of the general formula (III)

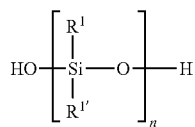
(III)

with at least one ketoximosilane of the general formula (IV)

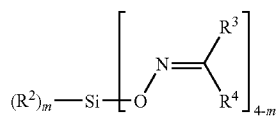
(IV)

Hydroxy-terminated polydiorganosiloxanes of the formula (III) are known and widely available. These compounds of the formula (III) preferably have at 25° C. a viscosity of between 100 and 500 000 mPas, in particular between 1000 and 350 000 mPas, more preferably between 5000 and 100 000 mPas. Their preparation is conventional, as mentioned, for example, in EP-A-0 384 609.

The ketoximosilanes of the general formula (IV) can be prepared, for example, from the corresponding ketoximes $OH-N=C(R^3)(R^4)$ and the alkoxy-silanes $(R^2)_m-Si-(OCH_3)_{4-m}$ or the chlorosilanes $(R^2)_m-Si-(Cl)_{4-m}$, as disclosed in DE-A-41 41 552, for example. Preference is given to methyltris(methyl-ethyl-ketoximo)silane, phenyltris(methyl-ethyl-ketoximo)silane, vinyltris(methyl-ethyl-ketoximo)silane or methyltris(isobutyl-ketoximo)silane. Particular preference is given to methyltris(methyl-ethyl-ketoximo)silane, vinyltris(methyl-ethyl-ketoximo)silane, and methyltris(isobutyl-ketoximo)silane. Ketoximosilanes of this kind are widely available commercially, as for example from ABCR GmbH & Co, Germany, or from Hanse-Chemie, Germany.

The reaction of the hydroxy-terminated polydiorganosiloxane of the formula (III) with the ketoximosilane of the formula (IV) takes place typically at room temperature, in particular in a stoichiometric excess of the ketoximosilane. It is preferred to use a 3- to 5-fold molar excess of the ketoximosilane of the formula (IV). The end of this conversion reaction can be determined by a "Titanal" test. In this test a sample is taken and admixed with tetrapropoxytitanate. The formation of a gel shows that silanols are still present and hence that the reaction is not yet complete. It may be of advantage for the hydroxy-terminated polydiorganosiloxane of the formula (III) to be present in a plasticizer or diluent. In one embodiment such a plasticizer or diluent is a silicone fluid, more particularly a trimethylsilyl-terminated polydiorganosiloxane. The use of such plasticizers or diluents is of advantage especially for hydroxy-terminated polydiorganosiloxanes of relatively high viscosity, in particular with values for n of more than 1000, in particular of more than 2000.

It is preferred that this reaction takes place in a short time. The rate of this reaction is dependent on $R^2$ and increases from methyl through phenyl to vinyl.

The ketoximosilane-terminated polydiorganosiloxanes of the general formula (I) can be used directly after their preparation for the preparation of the silicone composition, or stored before being used. Indeed, in the absence of moisture and when stored at room temperature, the ketoximosilane-terminated polydiorganosiloxanes of the general formula (I) are stable over a long time. It has been found, however, that the storage stability is also dependent on $R^2$. It increases in the sequence methyl>phenyl>vinyl. The selection of $R^2$=methyl is very advantageous in particular for availability and cost reasons, without the storage stability being inadequate for the majority of applications.

The silicone compositions comprise at least one alkoxysilane of the general formula (II)

$(R^5)_p Si(OR^6)_{4-p}$ (II)

Suitable alkoxysilanes are trialkoxysilanes and tetraalkoxysilanes. Dialkoxysilanes and monoalkoxysilanes are unsuitable, since when the corresponding composition is cured their crosslinking is inadequate or nil and they therefore lead to mechanical properties which are inadequate for use as a sealant and/or adhesive.

Suitability as $R^5$ is possessed in particular by $C_1$ to $C_6$ alkyl radicals, especially methyl and ethyl, vinyl or phenyl.

It is advantageous if the alkoxysilane of the formula (II) has a high reactivity. For this reason, methyl is preferred as $R^6$ relative to ethyl. Also for this reason, vinyl is preferred relative to methyl. In the case of tetraalkoxysilanes, the tetraethoxysilane is preferred relative to tetramethoxysilane on toxicological grounds. The smaller reactivity is likewise not a problem here on account of the higher functionality.

The alkoxysilane of the formula (II) is more preferably vinyltrimethoxysilane or tetraethoxysilane or a mixture thereof.

The alkoxysilanes may also be in ready-hydrolyzed (all $R^6$=H) or partly hydrolyzed (a part of all $R^6$=H) form. Alkoxysilanes which have already been (partly) hydrolyzed are highly reactive and accordingly, under certain circumstances, it may be very advantageous to use such alkoxysilanes. It is also clear to the person skilled in the art that siloxane oligomers as well, especially dimers or trimers, which can be formed by condensations of such silanol-containing (partly) hydrolyzed alkoxysilanes, with formation of siloxane bond (Si—O—Si), can be employed.

The silicone composition may where appropriate comprise further constituents as well.

Additional constituents of this kind are plasticizers, catalysts, organic and/or inorganic fillers, curing accelerants, pigments, adhesion promoters, processing assistants, rheology regulators, dyes, inhibitors, heat stabilizers, antistats, flame retardants, biocides, waxes, flow control agents, thixotropic agents, and other additives and raw materials that are common and are known to the person skilled in the art. Preferably the silicone composition, besides at least one ketoximosilane-terminated polydiorganosiloxane of the general formula (I) and at least one alkoxysilane of the general formula (II), further comprises at least one plasticizer, at least one catalyst, and at least one filler.

Particularly suitable as plasticizers are trialkylsilyl-terminated polydialkylsiloxanes, especially trimethylsilyl-terminated polydimethylsiloxanes. Preference is given to trimethylsilyl-terminated polydimethylsiloxanes having viscosities of between 0.01 and 10 Pas. Viscosities between 0.1 and 1 Pas are particularly preferred. It is, however, also possible to use trimethylsilyl-terminated polydimethylsiloxanes in which some of the methyl groups have been replaced by other organic groups such as phenyl, vinyl or trifluoropropyl, for example. Although linear trimethylsilyl-terminated polydimethylsiloxanes are used with particular preference as plasticizers, it is also possible to use those compounds which are branched and which come about through the use, in the starting products that serve for preparing the plasticizers, of small amounts of tri- or tetra-functional silanes. It is also possible, however, instead of the polysiloxane plasticizers, to use up to—typically—25% by weight, based on the total weight of the silicone composition, of other organic compounds, such as certain hydrocarbons or hydrocarbon mixtures, for example, as plasticizers. Such hydrocarbons may be aromatic or aliphatic. When making the selection, it is advantageous to ensure that these hydrocarbons have a low volatility and sufficient compatibility with the ketoximosilane-terminated polysiloxanes.

In order to achieve a sufficiently high crosslinking rate it is preferred to use catalysts, in particular in an amount of 0.01% to 5% by weight, based on the total weight of the silicone composition. Typical catalysts are organotin compounds, preferably dialkyltin compounds, such as dibutyltin dilaurate or diacetate, for example, and/or titanium compounds, such as tetrabutyl or tetraisopropyl titanate, or titanium chelates. Catalyst mixtures can be used as well.

To achieve defined mechanical properties it is possible to use active or inactive fillers. Preferred fillers having a high specific surface area are fumed silica or precipitated or coated calcium carbonate, especially calcium carbonate coated with stearic acid. Furthermore it is possible to use fillers with a low specific surface area as extenders. With active fillers, chemical or physical interactions with the polymer occur; with inactive fillers, these do not occur, or occur only to a minor extent. Use is made in particular of calcium carbonates, aluminum silicates, finely ground quartz, diatomaceous earth, iron oxides, etc. Preference is given in this context to ground calcium carbonate. In one particularly preferred embodiment the silicone composition comprises fumed silica as a filler. In one particularly preferred embodiment mixtures of fumed silica and calcium carbonate are used as a filler.

Particularly suitable adhesion promoters are alkoxysilanes, which are preferably substituted by functional groups. The functional group is, for example, an aminopropyl, glycidyloxypropyl or mercaptopropyl group. Amino-functional groups are preferred. The alkoxy group of the silane is usually a methoxy or ethoxy group. Particular preference is given to aminopropyl-trimethoxysilane, 3-aminopropyltrimethoxysilane, 3-(2-aminoethyl)aminopropyl-triethoxysilane, and 3-mercaptopropyltriethoxysilane. It is also possible to use a mixture of adhesion promoters. The proportion of such adhesion promoters is in particular between 0.1% and 5% by weight, in particular between 0.5% and 2% by weight, based on the total weight of the uncured silicone composition.

It is clear to the person skilled in the art that, when using silanes, there is always the possibility that, depending on moisture and conditions, there may be further siloxanes present in the silicone composition as well. Thus, for example, condensation reactions of (partly) hydrolyzed alkoxysilane or ketoximosilane components may form siloxanes, leading possibly in turn to oligomeric siloxanes, in particular to dimeric or trimeric siloxanes. Not only linear but also branched and cyclic oligomeric siloxanes are possible. Customarily, however, it is of great advantage if the amount of these oligomeric siloxanes does not exceed a certain degree.

The amount of ketoximosilane-terminated polydiorganosiloxane of the general formula (I) is, for silicone compositions without fillers, preferably between 99% and 50% by weight, in particular between 95% and 60% by weight, and, for silicone compositions with fillers, it is between 97% and 10% by weight, in particular between 90% and 25% by weight, based in each case on the total weight of the uncured silicone composition.

The amount of alkoxysilanes of the general formula (II) is preferably between 0.5% and 10% by weight, in particular between 1% and 5% by weight, based on the weight of the ketoximosilane-terminated polydiorganosiloxane of the general formula (I).

If the silicone composition comprises a filler, the amount of all the fillers is advantageously between 5% and 70% by weight, in particular between 10% and 55% by weight, based on the total weight of the uncured silicone composition.

The silicone composition may be prepared continuously or discontinuously by the methods that are known to the person skilled in the art, and using known apparatus. In order to obtain instances of unwanted crosslinking, it should be ensured that the raw materials employed, and also apparatus, are dried as far as possible prior to use, being ideally free of water, and that preparation takes place under vacuum or inert gas, such as nitrogen, for example.

In one embodiment of the invention the ketoximosilane-terminated polysiloxane is prepared in situ. In this case it is also possible to add a mixture of ketoximosilane of the formula (IV) and alkoxysilane of the formula (II) to the hydroxy-terminated polysiloxane of the formula (III) at room temperature. Owing to the reaction conditions and reactivities, the ketoximosilane-terminated polysiloxane of the formula (I) is formed in particular. Preparation in situ is very advantageous, since it can be carried out very rapidly, simply and cheaply, and requires no specific apparatus or reaction conditions or additional catalysts.

After the silicone composition has been prepared it can be dispensed into drums, hobbocks, pouches or cartridges. The containers are advantageously dry and are manufactured in particular from materials which have a high diffusion resistance with respect to water and water vapor. Tightly sealed, such silicone compositions are storage-stable: in other words, they are stored over a period of typically several months up to a year or more without altering their performance properties or their properties after curing to any service-relevant extent. Customarily the change in the skinover time is employed as a measure of the storage stability.

The silicone composition is moisture-curing. The ketoximosilane groups of the ketoximosilane-terminated polydiorganosiloxane of the general formula (I) and the alkoxysilane groups of the alkoxysilane of the general formula (II) react with water, undergoing hydrolysis to form silanol groups (Si—OH). The silanol groups formed condense in turn to form siloxane groups (Si—O—Si), whereby, owing to the functionality of the ingredients employed, the composition undergoes crosslinking. The alkoxysilane of the formula (II) acts here as a crosslinker.

The water needed for this process is, in particular, moisture, especially in the form of atmospheric humidity.

A silicone composition of this kind is also referred to as an RTV-1 silicone rubber (one-component, room temperature vulcanizing silicone rubber).

A particularly preferred one-component system (RTV-1) is one in which the silicone sealant and/or silicone adhesive polymerizes at room temperature under the influence of moisture, more particularly of atmospheric humidity, the crosslinking taking place through condensation of SiOH groups to form Si—O—Si bonds.

In this context it has emerged that the silicone compositions exhibit a great advantage from the standpoints of health and environment in that they contain very little free ketoxime (<1%). As a result of this it becomes possible to formulate silicone compositions which are advantageous from a labeling standpoint but which nevertheless exhibit the advantages of the ketoximosilane systems.

Suitable methods of applying the silicone composition are, for example, its application from standard commercial cartridges, which for relatively small-scale applications are preferably operated manually. Application by means of compressed air from a standard commercial cartridge or from a drum or hobbock by means of a conveying pump or an extruder, where appropriate by means of an application robot, is likewise possible. Such modes of application are preferred in particular in applications in industrial manufacture or in large-scale applications.

The silicone composition finds use in particular as a sealant and/or adhesive.

A further aspect of the invention concerns a method of sealing. It comprises the following steps:
applying a silicone composition as described above between a substrate S1 and a substrate S2,
curing the silicone composition by contact with moisture.
The substrates S1 and S2 here are alike or different from one another.

The silicone compositions are notable for a very broad spectrum of substrates S1 and S2 for which they are suitable as a sealant. In particular at least one of the substrates, S1 or S2, is glass, glass ceramic, concrete, mortar, brick, tile, ceramic, plaster, a natural stone such as granite or marble; a metal or an alloy such as aluminum, steel, nonferrous metal, galvanized metal; a wood, plastics such as PVC, polycarbonate, PMMA, polyester, epoxy resin; a powdercoating, enamel, a paint or a finish, more particularly an automotive finish.

The silicone composition finds application in particular in industrial manufacture, especially that of vehicles and articles of everyday use, and also in building, more particularly in construction and civil engineering.

Articles which comprise cured silicone compositions of the type described above are therefore, in particular, a built structure, an industrial product or a means of transport, more particularly a building, or a part thereof.

An exemplary enumeration of such articles includes houses, glass facades, windows, baths, bathrooms, kitchens, roofs, bridges, tunnels, roads, automobiles, trucks, railway vehicles, buses, ships, mirrors, plates, troughs, white goods, household appliances, dishwashers, and washing machines.

Examples

Preparation of Ketoximosilane-Terminated Polydiorganosiloxanes 100 parts by mass of Polymer FD-20 (Wacker Chemie, Germany) ($\alpha,\omega$-dihydroxy-terminated polydimethylsiloxane, viscosity 20 Pas (25° C.)) ("DHPS") were stirred together with 5.8 parts by mass of vinyltris(methyl-ethyl-ketoximo)silane in a planetary mixer under nitrogen at 25° C. for 15 minutes. The "Titanal" test showed that there were no longer any hydroxy-terminated polydimethylsiloxanes present and that the reaction had proceeded to completion. Nor are any silanol signals (3400 cm$^{-1}$) detectable any more in the IR spectrum.

The ketoximosilane-terminated polydiorganosiloxane KPS01 formed is a clear liquid. Its FTIR spectrum is shown in FIG. 1.

Band Assignment:
2962 cm$^{-1}$ CH valence, as, CH$_3$
2905 cm$^{-1}$ CH valence, sy, CH$_3$
1411 cm$^{-1}$ CH deformation, as, CH$_3$
1258 cm$^{-1}$ CH deformation, sy, CH$_3$
1009 cm$^{-1}$ Si—O valence, as, Si—O—Si
786 cm$^{-1}$ Si—C valence, as, Si(CH$_3$)$_2$ The ketoximosilane-terminated polydiorganosiloxane KPS02 was prepared in the same way but using 5.8 parts by mass of methyltris(methyl-ethyl-ketoximo)silane instead of the vinyltris(methyl-ethyl-ketoximo)silane.

Preparation of Alkoxysilan-Terminated Polydiorganosiloxane (APS01)

100 parts by mass of Polymer FD-20 (Wacker Chemie, Germany) ($\alpha,\omega$-dihydroxy-terminated polydimethylsiloxane, viscosity 20 Pas (25° C.)) ("DHPS") were heated to 70° C. in a planetary mixer under nitrogen. Subsequently a mixture of 5.8 parts by mass of vinyltrimethoxysilane and 0.03 part by mass of zinc acetylacetonate hydrate is added slowly and the mixture is stirred at 60° C. for one hour. The "Titanal" test showed that there were no longer any hydroxy-terminated polydimethylsiloxanes present and that the reaction has proceeded to completion.

Preparation of Silicone Compositions

The above-prepared 105.8 parts by mass of ketoximosilane-terminated polydiorganosiloxane KPS01 and KPS02 were admixed with the alkoxysilane stated in table 1 and also, subsequently, with 10 parts by mass of fumed silica having a BET surface area of 150 m$^2$/g, and the two components were fully homogenized. After mixing under vacuum for 15 minutes, 0.05 part by mass of dibutyltin diacetate ("DBTDA") was added, followed by mixing under vacuum for 5 minutes more. The resulting silicone compositions B1 to B4 were dispensed into moisture-tight aluminum cartridges.

The comparative example Ref. 1 was prepared in the same way as compositions B1 to B4, with the difference that a mixture of ketoximosilanes, without addition of alkoxysilanes, was added directly to the α,ω-dihydroxy-terminated polydimethylsiloxane.

The comparative example Ref. 2 was prepared in the same way as for comparative example Ref. 1 with the difference that alkoxysilanes were used instead of ketoximosilanes. However, the composition gelled within a short time after the addition of the catalyst.

Comparative example Ref. 3 was prepared in the same way as for example B1 with the difference that the alkoxysilane-terminated polysiloxane APS01 was used instead of the ketoximosilane-terminated polysiloxane KPS01.

assessed by two independent individuals in accordance with a scale from 0 (odorless) to 10 (extreme nuisance).

Skinover Time ("SOT")

The skinover time was measured as follows. After 1 day after the preparation of the composition, a bead of the silicone composition was applied from a cartridge to a polyethylene film and drawn out with a spatula to form a layer approximately 3 mm thick. The surface of this bead was touched carefully with the finger at regular intervals. The skinover time was the period of time which elapsed from the application of the silicone composition to the time at which silicone composition no longer adhered to the finger.

TABLE 1

| Silicone compositions (figures are parts by mass). | | | | | | | |
|---|---|---|---|---|---|---|---|
| | B1 | B2 | B3 | B4 | Ref. 1 | Ref. 2 | Ref. 3 |
| KPS01 | 105.8 | 105.8 | 105.8 | | | | |
| KPS02 | | | | 105.8 | | | |
| APS01 | | | | | | | 105.8 |
| DHPS | | | | | 100 | 100 | |
| Methyltris(methyl-ethyl-ketoximo)silane | | | | | 5.8 | | |
| Vinyltris(methyl-ethyl-ketoximo)silane | | | | | 5.8 | | |
| Vinyltrimethoxysilane | 5.8 | | | 5.8 | | 5.8 | 5.8 |
| Tetraethoxysilane | | 5.8 | | | | | |
| Methyltrimethoxysilane | | | 5.8 | | | 5.8 | |
| fumed silica | 10 | 10 | 10 | 10 | 10 | 10 | 10 |
| DBTDA | 0.05 | 0.05 | 0.05 | 0.05 | 0.05 | 0.05 | 0.05 |

Description of the Test Methods

Adhesion: Bead Test

To test the adhesion, the respective composition was applied in the form of a bead (150 mm long, 15 mm wide, and 6 mm high) from a cartridge to the respective substrate (plate) which in each case had been cleaned beforehand by wiping with a cloth soaked with Sika®Cleaner-205 and left to evaporate for 5 minutes. The substrate coated with the bead was then stored for 7 days under standard conditions (23±1° C., 50±5% relative humidity), after which the adhesion was tested. To test the adhesion, the cured bead was incized at one end just above the surface of the substrate (adhesion face). The incized end of the bead was held by hand and then carefully and slowly pulled from the substrate, with a peeling action in the direction of the other end of the bead. If in the course of this operation the adhesion was sufficiently strong that the end of the bead threatened to tear off on pulling, a cutter was used to apply a cut perpendicularly to the bead-pulling direction, down to the bare surface of the substrate, and in this way a section of bead was detached. Cuts of this kind were repeated if necessary in the course of further pulling at intervals of 2 to 3 mm. In this way the entire bead was peeled from the substrate. The adhesion properties were evaluated on the basis of the cured sealant that remains on the substrate surface after the bead has been removed (cohesive fracture), more specifically by an estimation of the cohesive component of the adhesion face, in percent.

Substrates Used:

Float glass Planilux from Saint-Gobain Glass, France

Eloxal Dark bronze, from SCHUCO, Germany

Stainless steel material No. 1.457, polished with 180 grade, Thyssen-Krupp Germany PVC RauPren 1406, Ca/Zn-stabilized, Rehau, Germany Powder-coated aluminum ("$Al_{PB}$") Interpon D2525, bone white, AKZO Italy Odor The odor was evaluated by smelling during application ("$O_{app}$") or during curing (after 1 day) ("$O_{cur}$"). The odor was The skinover time after artificial storage ("$SOT_{70°\,C.}$") was done in exactly the same way except that the silicone composition was stored in the cartridge at 70° C. for 7 days and cooled to 23° C. over 1 day prior to application.

Mechanical Properties

The tensile strength ("TS"), braking extension ("BE") (i.e., extension at maximum force), and the strain at 50% extension ("$ST_{50}\%$") were measured in accordance with DIN 53 504 on S2 specimens which have been stored at 23° C. and 50% relative humidity for 7 days, using a measuring speed of 200 mm/min on a Zwick/Roell Z005 tensile machine. The values reported are the average values of 5 specimens. A similar procedure was carried out with silicone composition which had been stored beforehand in the cartridge at 70° C. for 7 days. The mechanical properties thus determined carry the index "70° C." in their identification in table 2.

Storage Stability

The storage stability was assessed by comparing the skinover time (SOT) with the skinover time after hot storage ($SOT_{70°\,C.}$). A ratio of $SOT_{70°\,C.}/SOT \leq 2$ and $SOT_{70°\,C.}/SOT > 0.5$ corresponds to a storage stability at room temperature of at least 6 months. Silicone compositions of this kind are qualified as "good". A ratio of $SOT_{70°\,C.}/SOT$ of between 2 and 2.5 is acceptable and is identified as "acc.". If $SOT_{70°\,C.}$ is no more than ±20% different from SOT, a storage stability of more than 6 months at room temperature is likely, and silicone compositions of this kind are adjudged to be "very good".

Results

The results from table 2 show that the silicone compositions of the invention exhibit good properties with respect to adhesion and mechanical values and that they are distinguished by an advantageous odor.

TABLE 2

Test results of the silicone compositions.

| Adhesion | B1 | B2 | B3 | B4 | Ref. 1 | Ref. 3 |
|---|---|---|---|---|---|---|
| Glass | 100 | 100 | 100 | 100 | 100 | 0 |
| Eloxal | 100 | 100 | 100 | 100 | 100 | 0 |
| Stainless steel | 100 | 100 | 100 | 100 | 100 | 0 |
| PVC | 100 | 100 | 100 | 100 | 100 | 0 |
| $Al_{PB}$ | 100 | 100 | 100 | 100 | 100 | 0 |
| SOT [min] | 30 | 30 | 30 | 35 | 35 | no cure |
| $SOT_{70°\,C.}$ [min] | 60 | 60 | 55 | 40 | 40 | no cure |
| Storage stability | good | good | very good | very good | very good | not determinable |
| TS [MPa] | 1.50 | 1.90 | 1.70 | 1.54 | 1.54 | not determinable |
| $TS_{70°\,C.}$ [MPa] | 1.00 | 0.84 | 1.72 | 1.87 | 1.41 | not determinable |
| BE [%] | 315 | 426 | 363 | 552 | 666 | not determinable |
| $BE_{70°\,C.}$ [%] | 526 | 604 | 336 | 371 | 260 | not determinable |
| $ST_{50\%}$ [MPa] | 0.45 | 0.40 | 0.43 | 0.30 | 0.19 | not determinable |
| $ST_{70°\,C.\,50\%}$ [MPa] | 0.18 | 0.11 | 0.47 | 0.50 | 0.52 | not determinable |
| $O_{app}$ | 3 | 3 | 3 | 3 | 8 | 2 |
| $O_{cur}$ | 3 | 3 | 3 | 3 | 8 | not determinable |

The invention claimed is:

1. A silicone composition comprising
    (a) at least one ketoximosilane-terminated polydiorganosiloxane of the general formula (I)

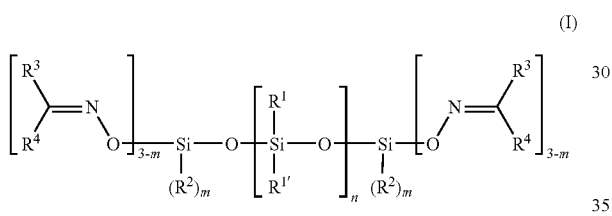

(I)

where
   $R^1$ and $R^{1'}$ independently are each an unsubstituted or substituted alkyl, alkenyl, or aryl radical,
   $R^2$ independently at each occurrence is an unsubstituted or substituted alkyl, alkenyl, or aryl radical,
   $R^3$ and $R^4$ are each an alkyl radical,
   n stands for values from 20 to 3000, and
   m is either 0 or 1;
   (b) at least one alkoxysilane of the general formula (II)

(II)

where
   $R^5$ independently at each occurrence is an unsubstituted alkyl radical, alkenyl radical, aryl radical, or a radical of the formula —$(R^7$—$O)_q$—$R^8$,
      where $R^7$ is alkylene, $R^8$ is an alkyl radical, and q stands for a value between 1 and 5,
   $R^6$ independently at each occurrence is H or is an alkyl radical, and
   p is either 0 or 1;
   (c) at least one trialkylsilyl-terminated polydialkylsiloxane as a plasticizer; and
   (d) at least one catalyst;
   wherein
      the at least one catalyst includes an organotin compound;
      the silicone composition comprises less than 1% free ketoximosilanes, and the ketoximosilane-terminated polydiorganosiloxane is present in an amount of from about 25% to about 99% by weight of the silicone composition.

2. The silicone composition of claim 1, wherein the ketoximosilane-terminated polydiorganosiloxane of the general formula (I) is obtainable by reacting
   at least one hydroxy-terminated polydiorganosiloxane of the general formula (III)

(III)

with at least one ketoximosilane of the general formula (IV)

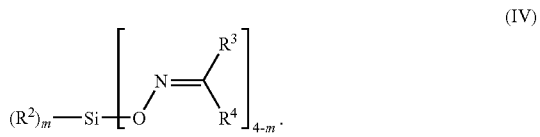

(IV)

3. The silicone composition of claim 1, wherein $R^1$=$R^{1'}$.

4. The silicone composition of claim 1, wherein $R^2$ is methyl, vinyl, or phenyl.

5. The silicone composition of claim 1, wherein m=0.

6. The silicone composition of claim 1, wherein $R^3$ is methyl and $R^4$ is methyl, ethyl or isobutyl.

7. The silicone composition of claim 1, wherein the alkoxysilane of the formula (II) is vinyltrimethoxysilane, tetraethoxysilane, or a mixture thereof.

8. The silicone composition of claim 1, wherein the composition comprises an adhesion promoter.

9. The silicone composition of claim 1, wherein the silicone composition further comprises at least one filler.

10. A process for preparing a silicone composition of claim 1, comprising the steps of:
(a) reacting at least one hydroxy-terminated polydiorganosiloxane of the general formula (III)

(III)

with at least one ketoximosilane of the general formula (IV)

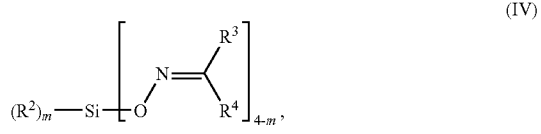

(IV)

in the presence of at least one catalyst, wherein the at least one catalyst includes an organotin compound; and
(b) admixing at least one ketoximosilane-terminated polydiorgano-siloxane resulting from the reaction in step (a) with at least one alkoxysilane of the general formula (II)

(II).

11. The process of claim 10, wherein the hydroxy-terminated polydiorganosiloxane is present in the plasticizer in step (a) of reacting.

12. The process of claim 10, wherein further additives are added simultaneously with or after step (b).

13. The process of claim 10, wherein the reaction of the hydroxyl-terminated polydiorganosiloxane of the general formula (III) with the ketoximosilane of the general formula (IV) takes place at room temperature in a stoichiometric excess of the ketoximosilane.

14. The process of claim 13, wherein the ketoximosilane is at a 3- to 5-fold molar excess in the reaction in step (a).

15. A method of sealing, comprising the steps of:
applying a silicone composition of claim 1 between a substrate S1 and a substrate S2, and
curing the silicone composition by contact with moisture, substrates S1 and S2 being alike or different from one another.

16. The method of claim 15, wherein at least one of the substrates, S1 or S2, is glass, glass ceramic, concrete, mortar, brick, tile, ceramic, plaster, a natural stone, a metal or an alloy, a wood, plastics, a powdercoating, enamel, a paint or a finish.

17. An article comprising at least one moisture-cured silicone composition of claim 1.

18. The article of claim 17, wherein the article is a built structure, an industrial product, or a means of transport.

19. The silicone composition of claim 1, wherein the plasticizer is a trimethylsilyl-terminated polydimethylsiloxane.

20. A silicone composition comprising
(a) at least one ketoximosilane-terminated polydiorganosiloxane of the general formula (I)

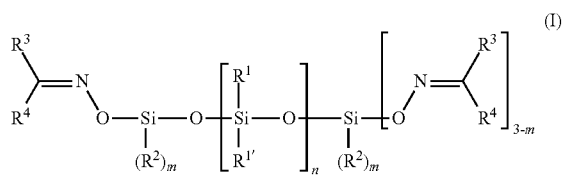

(I)

where
R$^1$ and R$^{1'}$ independently are each an unsubstituted or substituted alkyl, alkenyl, or aryl radical,
R$^2$ independently at each occurrence is an unsubstituted or substituted alkyl or alkenyl radical,
R$^3$ and R$^4$ are each an alkyl radical,
n stands for values from 20 to 3000, and
m is either 0 or 1;
(b) at least one alkoxysilane of the general formula (II)

(II)

where
R$^5$ independently at each occurrence is an unsubstituted alkyl radical, alkenyl radical, aryl radical, or a radical of the formula —(R$^7$—O)$_q$—R$^8$,
where R$^7$ is alkylene, R$^8$ is an alkyl radical, and q stands for a value between 1 and 5,
R$^6$ independently at each occurrence is H or is an alkyl radical, and
p is either 0 or 1;
(c) at least one trialkylsilyl-terminated polydialkylsiloxane as a plasticizer; and
(d) at least one catalyst;
wherein the at least one catalyst includes an organotin compound; and the ketoximosilane-terminated polydiorganosiloxane is present in an amount of from about 25% to about 99% by weight of the silicone composition.

21. The silicone composition of claim 20, wherein the plasticizer is a trimethylsilyl-terminated polydimethylsiloxane.

* * * * *